United States Patent [19]

Lühmann et al.

[11] Patent Number: 4,731,121
[45] Date of Patent: Mar. 15, 1988

[54] VISCOUS CELLULOSE-CONTAINING MIXTURE (PASTE) AND USE THEREOF IN THE PRODUCTION OF AQUEOUS COATING DISPERSIONS

[75] Inventors: Erhard Lühmann, Bomlitz; Lutz Hoppe; Klaus Szablikowski, both of Walsrode; Hans-Joachim Traenckner, Krefeld, all of Fed. Rep. of Germany

[73] Assignee: Wolff Walsrode Aktiengesellschaft, Walsrode, Fed. Rep. of Germany

[21] Appl. No.: 801,176

[22] Filed: Nov. 22, 1985

[30] Foreign Application Priority Data

Dec. 6, 1984 [DE] Fed. Rep. of Germany ....... 3444493

[51] Int. Cl.[4] ............................ C08L 1/08; C08L 1/10
[52] U.S. Cl. .................................... 106/181; 106/170; 106/178; 106/182; 106/195; 524/37
[58] Field of Search ............... 106/170, 178, 195, 198, 106/196, 181, 182; 524/37

[56] References Cited

U.S. PATENT DOCUMENTS

| | | | |
|---|---|---|---|
| 2,792,314 | 5/1957 | Brown | 106/170 |
| 3,341,343 | 9/1967 | Beiswanger et al. | 106/196 |
| 3,615,792 | 10/1971 | Keene | 106/198 |
| 4,177,172 | 12/1979 | Traenckner et al. | 524/31 |
| 4,197,221 | 4/1980 | Eisenmenger et al. | 106/195 |
| 4,404,034 | 9/1983 | Kawatani | 106/238 |
| 4,469,627 | 9/1984 | Trombone | 106/177 |
| 4,502,888 | 3/1985 | Leng et al. | 106/198 |
| 4,517,324 | 5/1985 | Lühmann et al. | 106/195 |

FOREIGN PATENT DOCUMENTS 3139840 4/1983 Fed. Rep. of Germany .
1090387 2/1965 United Kingdom .

*Primary Examiner*—Theodore Morris
*Attorney, Agent, or Firm*—Sprung Horn Kramer & Woods

[57] ABSTRACT

Cellulose-containing pastes which may be diluted in low-solvent, high-solids aqueous cellulose lacquer dispersions and which contain certain anion-active emulsifiers.

6 Claims, No Drawings

VISCOUS CELLULOSE-CONTAINING MIXTURE (PASTE) AND USE THEREOF IN THE PRODUCTION OF AQUEOUS COATING DISPERSIONS

It is known that aqueous coating compositions may be prepared from cellulose esters.

Thus, DOS No. 2,203,554 describes the production of nitrocellulose lacquer emulsions which have a solids content of from 13 to 16.6%, by weight, and a solvent content of from 37.6 to 44.2%, by weight.

The concentration ratios of solids to organic solvent are always less than unity and correspond to the conventional concentration ratios (c.f. DOS No. 2,203,554, page 5, 1st paragraph, reference to A. Kraus, Handbuch der Nitrocelluloselacke, Verlag W. Pansegrau, Berlin-Wilmersdorf, 1952).

The high organic solvent content is regarded as necessary because, using conventional mechanical emulsifying techniques (c.f. DOS. No. 2,203,554, page 5, 1st paragraph), a low-viscosity organic phase containing the lacquer components is necessary for obtaining a storable emulsion. Those skilled in the art have been of the opinion that the organic phase cannot be emulsified to the necessary droplet form if it is viscous or paste-like (A. Kraus, Zentralblatt 1940, p. 225,225).

To overcome this disadvantage, efforts were made to dissolve the lacquer components in an excess of organic solvents, followed by emulsification in water, and then to distill off the organic solvent again either completely or partially (DOS No. 2,703,075, DAS No. 1,286,672). The disadvantage of this process is that it is very expensive.

It has now surprisingly been found that the viscous, cellulose-containing pastes having the composition according to the present invention may be directly converted into low content of organic solvent, high-solid content aqueous cellulose lacquer dispersions providing the ratio of solids to organic solvent before dispersion in water is at least 1 and the cellulose-containing paste contains certain anion-active emulsifiers as emulsifiers.

In this way, the organic phase is stably-dispersed in water at low temperatures (up to at most 60° C.) without a need for intense shear forces. In addition, the coatings obtaining from the corresponding aqueous dispersions are distinguished by an immediately glossy, non-yellowing surface which no longer has to be polished.

The present invention relates to viscous, cellulose-containing mixtures or rather pastes consisting of:
from 5.0 to 60%, by weight, preferably from 15 to 45%, by weight, of cellulose esters;
from 0 to 55%, by weight, preferably from 0 to 35%, by weight, of conventional lacquer resins;
from 0.0 to 40%, by weight, preferably from 0 to 35%, by weight, of plasticizers;
from 0.05 to 1.5%, by weight, preferably from 0.1 to 1.3%, by weight, of anion-active emulsifiers;
from 5 to 45%, by weight, preferably from 5 to 35%, by weight, of at least one organic solvent;
from 0 to 30%, by weight, preferably from 5 to 25%, by weight, of water;
wherein the % by weight always amount to 100, characterized in that the ratio of solids to organic solvent is greater than or equal to 1 and in that carboxylates, sulphates, sulphonates, phosphates, phosphites or phosphonates of non-ionic surface-active alkyl, aryl, alkaryl glycol ethers, acylated or alkylated alkanolamine polyglycol ethers or copolymers of ethylene oxide and/or propylene oxide are used as anion-active emulsifiers in quantities of up to at most 1.5%, by weight, based on the solids content.

The present invention also relates to processes for the production of storable, aqueous coating dispersions of the oil-in-water type based on an organic phase emulsified in water of a cellulose ester, an anion-active emulsifier, optionally resins and optionally a plasticizer optionally in a solution in an organic solvent or solvent mixture, characterized in that, in the preparation of the organic phase, the ratio of solids to organic solvent or solvent mixture is maintained at at least >1 and in that carboxylates, sulphates, sulphonates, phosphates, phosphites and phosphonates of non-ionic surface-active alkyl, aryl, alkaryl polyglycol ethers, acylated or alkylated alkanolamine polyglycol ethers or copolymers of ethylene oxide or propylene oxide are used as anion-active emulsifiers and water in the conventional quantities is added, preferably dropwise, to the organic phase without further dilution at temperatures of at most 60° C., preferably at temperatures of 45° C.

Preferred cellulose esters include nitrocellulose of any viscosity stage or plasticized nitrocellulose or mixtures thereof.

A particularly suitable cellulose ester is nitrocellulose, for example the standard collodion cotton qualities, i.e. cellulose nitric acid esters having a nitrogen content of from 10.2 to 12.4%, by weight.

The plasticizers used, if any, may be of the conventional types, such as the esters of aliphatic monocarboxylic acids, such as cetyl acetate, glycol diacetate, stearates, ricinolacetates; aromatic monocarboxylic acids, such as dioctyl adipate, dimethyl cyclohexyl-methyl adipate, dibutyl sebacate; aromatic dicarboxylic acids, such as dibutyl phthalate, dioctyl phthalate, dicyclohexyl phthalate, dimethylglycol phthalate, aliphatic tricarboxylic acids, such as tributyl citrate, inorganic acids, such as tributyl phosphate, triphenyl phosphate; and also sulphonamides, oils, such as castor oil and linseed oil, and ethoxylation products of the above-mentioned compounds, such as ethoxylated castor oils and soya oils, stearates and phosphoric acid esters.

The anion-active emulsifiers may be produced by converting the noon-ionic surfactants into anion-active emulsifiers using methods known from the literature (c.f. Dr. K. Lindner, Tenside, Textilhilfsmittel, Waschrohstoffe, Wissenschaftl. Verlagsgesellschaft, Stuttgart, 1964). For example, the non-ionic surfactants may be converted into carboxylates by reaction with α-halogen carboxylic acids, into sulphates by reaction with sulphuric acid or chlorosulphinic acid, into phosphates and phosphites by reaction with phosphorus oxides, phosphorus halides or phosphoric acid, into sulphonates by reaction with epichlorohydrin and then with sodium hydrogen sulphite or by reaction with sulfones or by reaction with isothionic acid or chloroethane sulphonic acid or by reaction with maleic acid anhydride, followed by addition with sodium hydrogen sulphite, or finally into phosphonates by reaction with phosphonocarboxylic acids.

Suitable non-ionic surfactants include alkyl, acyl, aryl, alkylaryl polyglycol ethers and also acylamido- and alkylamino-polyglycol ethers which contain from 10 to 30 carbon atoms in the alkyl, acyl, aryl or alkylaryl group and which may be obtained in known manner by alkoxylation of conventional alkanols, carboxylic acid amides or alkylamines, carboxylic acids, phenols or alkyl phenols, carboxylic acid amides or alkylamines with ethylene oxide and/or propylene oxide.

Other suitable non-ionic surfactants are copolymers of ethylene and propylene oxide. They are block, mixed or mixed block copolymers which are also formed by alkoxylation of (lower)$C_1$-$C_6$ alcohols.

Accordingly, the emulsifiers are carboxylates, sulphonates, sulphates, phosphates, phosphites and phosphonates which have been obtained by known reactions from non-ionic surfactants, such as alkyl, aryl, alkaryl, acyl, polyglycol ethers, acylated or alkylated alkanolamine polyglycol ethers or copolymers of ethylene oxide and/or propylene oxide.

Particularly preferred emulsifiers are the sulphonosuccinic acid derivatives of ethoxylated nonylphenols, more especially the disodium salts of sulphosuccinic acid derivatives.

Suitable solvents for producing the organic phase are the conventional organic solvents, preferably acetates, such as ethyl acetate, isopropyl acetate, butyl acetate, 2-ethylhexyl acetate, methoxypropyl acetate, methoxy-n-butyl acetate and butylglycol acetate, ketones, such as methyl-isobutyl ketone, diisobutyl ketone, 2-cyclohexylhexanone and isophorone.

Other conventional resins, such as alkyd, maleic acid, phenolic formaldehyde, xylene, formaldehyde, ketone, sulphonamide, aldehyde, amine, epoxy, carbamic acid ester, coumarone-indene resins, esters of sucrose, vinyl, acrylate resins and copolymerization resins thereof, may be added to the cellulose ester solution.

The coating dispersions are prepared by dissolving the cellulose esters, one or more emulsifiers, the plasticizer, if any, and other resins, if any, in one another, optionally using an organic solvent or solvent mixture, and adding water, preferably dropwise, to the resulting cellulose-containing mixture (paste) at temperatures of at most 60° C., preferably at most 45° C.

Depending on the field of application (for example wood, metal, plastics, papers, leather, glass and film lacquering), it is possible to add other known organic solvents to the emulsion, although the solvent concentration should not exceed 25%, based on the final lacquer formulation. In addition, substances which improve processing or performance properties, such as lubricants, gloss-enhancers, anti-foam agents, sandability promoters, levelling aids, stabilizers, light stabilizers and dyes, may also be added to the dispersion, preferably to the aqueous phase.

The aqueous coating dispersions prepared in accordance with the present invention show good levelling properties, high gloss and a long storage life. Lacquer compositions formulated according to the present invention may show, for example, excellent resistance to alcohols and water or fastness to wet rubbing.

In addition, they show high resistance to yellowing and excellent gloss without having to be polished.

Accordingly, the present invention also relates to the use of the aqueous dispersions for the formulation of quick-drying coatings, especially on paper, metal and plastic films.

EXAMPLE 1

45.46 parts, by weight, of cellulose nitrate complying with Standard 34E and containing 35%, by weight, of water as moistening agent were stirred into and homogenized in a solution of 0.45 part, by weight, of emulsifier (reaction product of ethoxylated nonylphenol containing 50 EO-units with maleic acid anhydride and sodium hydrogen sulphite), 10.00 parts, by weight, of dibutyl phthalate, 7.00 parts, by weight, of ethyl glycol acetate, 6.00 parts, by weight, of methyl isoamyl ketone and 5.00 parts, by weight, of diacetone alcohol. After homogenization, 57.21 parts, by weight, of water were added dropwise with stirring at 20° C.

A 33%, by weight, storable dispersion containing 15%, by weight, of solvent is obtained. This dispersion was applied to a test card (Erichsen type 2415) by means of a doctor (15μm) and dried for 2 minutes at 160° C. The surface did not yellow and was immediately glossy.

We claim:

1. A viscous cellulose-containing paste by weight comprising approximately 5.0 to 60% of cellulose nitrate, 0.0 to 55% of a conventional lacquer resin, 0.0 to 40% of a plasticizer, 0.05 to 1.5% of a sulphosuccinic acid derivative of an ethoxylated nonylphenol as an anion-active emulsifier, 5 to 45% of at least one organic solvent, and 0.0 to 30% of water; the ratio of solids to organic solvent being at least equal to 1 and the anion-active emulsifier being present in at most 1.5% by weight, based on the solids content.

2. A paste according to claim 1, by weight comprising approximately 15 to 45% of cellulose nitrate; 0 to 35% of a conventional lacquer resin; 0 to 35% of a plasticizer; 0.1 to 1.3% of a sulphosuccinic acid derivative of an ethoxylated nonylphenol as anion-active emulsifierp; 5 to 35% of at least one organic solvent; and from 5 to 25% of water.

3. A paste according to claim 1, wherein the sulphosuccinic acid derivative is in the form of a di-sodium salt.

4. A process for the production of a storage aqueous coating emulsion of the oil-in-water type comprising adding water directly to a paste according to claim 1 at a temperature of at most 60° C.

5. A process as claimed in claim 4, wherein the water is added dropwise at a temperature of at most 45° C.

6. A quick drying, instantly glossy, non-yellowing coating produced from a mixture of water and a paste according to claim 1.

* * * * *